(12) United States Patent
Jiang et al.

(10) Patent No.: US 11,936,934 B2
(45) Date of Patent: Mar. 19, 2024

(54) METHOD AND SYSTEM FOR PREVENTING A FRAUDULENT VIDEO RELAY

(71) Applicant: Beijing Xitong Wuzhou Zhilian Technology Co., Ltd., Beijing (CN)

(72) Inventors: Xizhuo Jiang, Beijing (CN); Xizhi Hao, Beijing (CN)

(73) Assignee: Beijing Xitong Wuzhou Zhilian Technology Co., Ltd., Beijing (CN)

( * ) Notice: Subject to any disclaimer, the term of this patent is extended or adjusted under 35 U.S.C. 154(b) by 617 days.

(21) Appl. No.: 17/043,253

(22) PCT Filed: Apr. 4, 2019

(86) PCT No.: PCT/CN2019/000063
§ 371 (c)(1),
(2) Date: Mar. 11, 2021

(87) PCT Pub. No.: WO2019/196518
PCT Pub. Date: Oct. 17, 2019

(65) Prior Publication Data
US 2021/0195268 A1    Jun. 24, 2021

(30) Foreign Application Priority Data

Apr. 10, 2018  (CN) .......................... 201810314259.1

(51) Int. Cl.
*G06F 15/173*  (2006.01)
*H04L 9/32*  (2006.01)
(Continued)

(52) U.S. Cl.
CPC ..... *H04N 21/25875* (2013.01); *H04L 9/3239* (2013.01); *H04L 63/08* (2013.01);
(Continued)

(58) Field of Classification Search
CPC ......... H04N 21/25875; H04N 21/2541; H04N 21/4334; H04N 21/4402; H04N 21/4532;
(Continued)

(56) References Cited

U.S. PATENT DOCUMENTS 10,841,372 B1 * 11/2020 Ram ...................... H04L 65/80
2014/0229582 A1    8/2014 Liu et al.
(Continued)

FOREIGN PATENT DOCUMENTS

CN          102055777 A     5/2011
CN          107666484 A     2/2018
(Continued)

OTHER PUBLICATIONS

International Search Report and Written Opinion for PCT Appl. No. PCT/CN2019/000063, dated Jun. 12, 2019, 7 Pages.

*Primary Examiner* — Alan S Chou
(74) *Attorney, Agent, or Firm* — Maine Cernota & Curran

(57) ABSTRACT

The disclosure provides a method and system for preventing a fraudulent video relay. The method comprises: a video source node slicing a video source and relaying fragments of video data to next nodes; a relay node user receiving a relayed fragment of video data from a previous node and writing a video relay session information into a system; a viewing node establishing a video relay session with the relay node, receiving, reassembling, decoding and playing the fragment of video data, and regularly recording relay behavior data to the system; and a relay reward node regularly obtaining unprocessed relay behavior data, calculating a reward value for each relay user, and writing the reward value into a block-chain system, to implement accurate rewards of relay.

16 Claims, 11 Drawing Sheets

(51) Int. Cl.
  *H04L 9/40*      (2022.01)
  *H04N 21/254*    (2011.01)
  *H04N 21/258*    (2011.01)
  *H04N 21/433*    (2011.01)
  *H04N 21/4402*   (2011.01)
  *H04N 21/45*     (2011.01)
  *H04N 21/475*    (2011.01)
  *H04N 21/488*    (2011.01)
  *H04N 21/63*     (2011.01)
  *H04L 9/00*      (2022.01)

(52) U.S. Cl.
  CPC ..... *H04N 21/2541* (2013.01); *H04N 21/4334* (2013.01); *H04N 21/4402* (2013.01); *H04N 21/4532* (2013.01); *H04N 21/4753* (2013.01); *H04N 21/4882* (2013.01); *H04N 21/632* (2013.01); *H04L 9/32* (2013.01); *H04L 9/3236* (2013.01); *H04L 9/50* (2022.05)

(58) Field of Classification Search
  CPC ........... H04N 21/4753; H04N 21/4882; H04N 21/632; H04L 9/3239; H04L 63/08; H04L 9/50; H04L 9/32; H04L 9/3236

USPC ........................................................ 709/225
  See application file for complete search history.

(56) References Cited

U.S. PATENT DOCUMENTS

| | | | |
|---|---|---|---|
| 2018/0197156 A1* | 7/2018 | Beesley | H04M 15/66 |
| 2019/0122155 A1* | 4/2019 | Irazabal | G06Q 10/06311 |
| 2020/0327378 A1* | 10/2020 | Smith | G06N 5/048 |
| 2021/0073212 A1* | 3/2021 | Conley | H04L 9/3213 |
| 2022/0210266 A1* | 6/2022 | Kats | H04M 3/42042 |
| 2023/0179955 A1* | 6/2023 | Williams | G16H 20/70 |
| | | | 455/456.1 |

FOREIGN PATENT DOCUMENTS

| | | |
|---|---|---|
| CN | 107770115 A | 3/2018 |
| CN | 108521590 A | 9/2018 |

\* cited by examiner

METHOD AND SYSTEM FOR PREVENTING A FRAUDULENT VIDEO RELAY

RELATED APPLICATIONS

This application is a national phase application filed under 35 USC § 371 of PCT Application No. PCT/CN2019/000063 with an International filing date of Apr. 4, 2019, which claims the priority of CN Patent Application 201810314259.1 filed Apr. 10, 2018. Each of these applications is herein incorporated by reference in its entirety for all purposes.

TECHNICAL FIELD

The disclosure relates to the field of information technology, in particular to a method and system for preventing a fraudulent video relay in the process of video data relay based on blockchain.

BACKGROUND ART

With the rapid development of the quantity and quality of various computer equipment, networks, and video resources, live and on-demand video services have shown a spurt of growth, which also brings a series of serious problems, mainly in the following three aspects:
1) a sharp increase in bandwidth costs of video service providers has become a main bottleneck restricting the dissemination of various high-quality content;
2) the bandwidth transmission bottleneck seriously affects user's video viewing experience, due to frequent stuttering and delay;
3) a video data transmission under a centralized transmission architecture has caused great pressure on the backbone Internet, which has increased the operating costs of network operators.

In order to solve the above three main bottlenecks that restrict the development of video services, an application of a decentralized video relay solution based on the blockchain technology has gradually become one of the main directions of various service providers. The decentralized video relay solution achieves a rapid video distribution with a fast and reasonable video relay among video users, thereby fundamentally solving the serious dependence of video services on the bandwidth resources of the central server. Although some companies have proposed various video relay methods based on content delivery network (Content Delivery Network, CDN for short) distribution, from the perspective of the source of the video content obtained by the client, various video relay methods still have not resolved the problem that video transmission still heavily depends on the bandwidths of various types of central video Servers.

The blockchain technology is also called as distributed ledger technology, which is a new application mode of computer technologies such as distributed data storage, p2p transmission, consensus mechanism, and encryption algorithm. The unique characteristics of trust-free and value transfer make the realization of the decentralized video relay system more practical. Utilizing user nodes all over the country, based on the value transfer characteristics of the blockchain, the user nodes are willing to share the bandwidth to achieve a peer to peer (p2p for short) video transmission network based on district and connectivity, in order to obtain bandwidth sharing rewards from the service provider or system, to realize reasonable routing of video data, reduce traffic impact on the central server, increase data transmission speed, and improve users' experience of viewing videos. Due to the existence of value rewards based on sharing bandwidth, blockchain-based decentralized video relay systems have more vitality and robustness compared with pure video relay systems. However, it will be inevitable for a decentralized system to face various malicious frauds for obtaining the sharing rewards by forging video relays, which will seriously affect the deserved interests of relay nodes that normally share bandwidth, thereby fundamentally shaking the value distribution basis of the blockchain-based decentralized video relay system, to cause a collapse of the system. Therefore, how to objectively and accurately suppress the deserved interests of forged relay nodes and ensure the deserved interests of normal relay nodes will be the key to build a blockchain-based decentralized video relay system.

SUMMARY

The embodiment of this specification provide a method and a system for preventing a fraudulent video relay, so as to prevent unreasonable rewards for fraudulent video relays from infringing on the interests of normal video relay users.

The embodiment of this specification provide a method for preventing a fraudulent video relay, comprising:
 a video source node slicing a video source and relaying fragments of video data to next nodes;
 a relay node user receiving a relayed fragment of video data from a previous node and writing a video relay session information to a system;
 a viewing node establishing a video relay session with the relay node, receiving, reassembling, decoding, and playing the fragment of video data, and at the same time regularly recording relay behavior data to the system; and
 a relay reward node regularly obtaining unprocessed relay behavior data, calculating a reward value for each relay user, and writing the reward value into a blockchain system.

The embodiment of this specification also provide a system for preventing a fraudulent video relay, comprising:
 a video source publishing module, configured for publishing operations of various live and on-demand video streams; wherein the publishing operations comprise video hash coding, video data slicing, calculation and reception of corresponding hash codes, and operations of receiving connection verification, establishment and video data relay of next video receiving nodes (such as a viewing node or a relay node);
 a video source verification module, configured for a hash verification of a specified video stream data slice;
 a relay module, configured to receive video data from a previous module (such as the video source publishing module) and relay the video data to a viewing module;
 a viewing module, configured to receive and play videos;
 a user module, configured for identity authentication, login session retention and verification of the relay users and the viewing users;
 a relay session module, configured to record and verify relay and forwarding chains of the relay module and the viewing module;
 a relay behavior recording module, configured to verify and record relay behaviors of the relay users; and
 a relay reward module, configured to analyze and reward the relay behaviors, and record reward results in the blockchain system.

The disclosure also provides a device, comprising one or more processors and a memory; wherein the memory contains instructions that can be executed by the one or more processors, to perform the method for preventing the fraudulent video data relay provided by embodiment of the disclosure.

The disclosure also provides a computer-readable storage medium storing a computer program, which makes a computer to execute the method for preventing the fraudulent video relay provided by embodiment of the disclosure.

DETAILED DESCRIPTION OF THE EMBODIMENT

In order to make the objectives, technical solutions, and advantages of the disclosure clearer, the following further describes the embodiment of the disclosure in detail with reference to the accompanying drawings.

Figure 1:
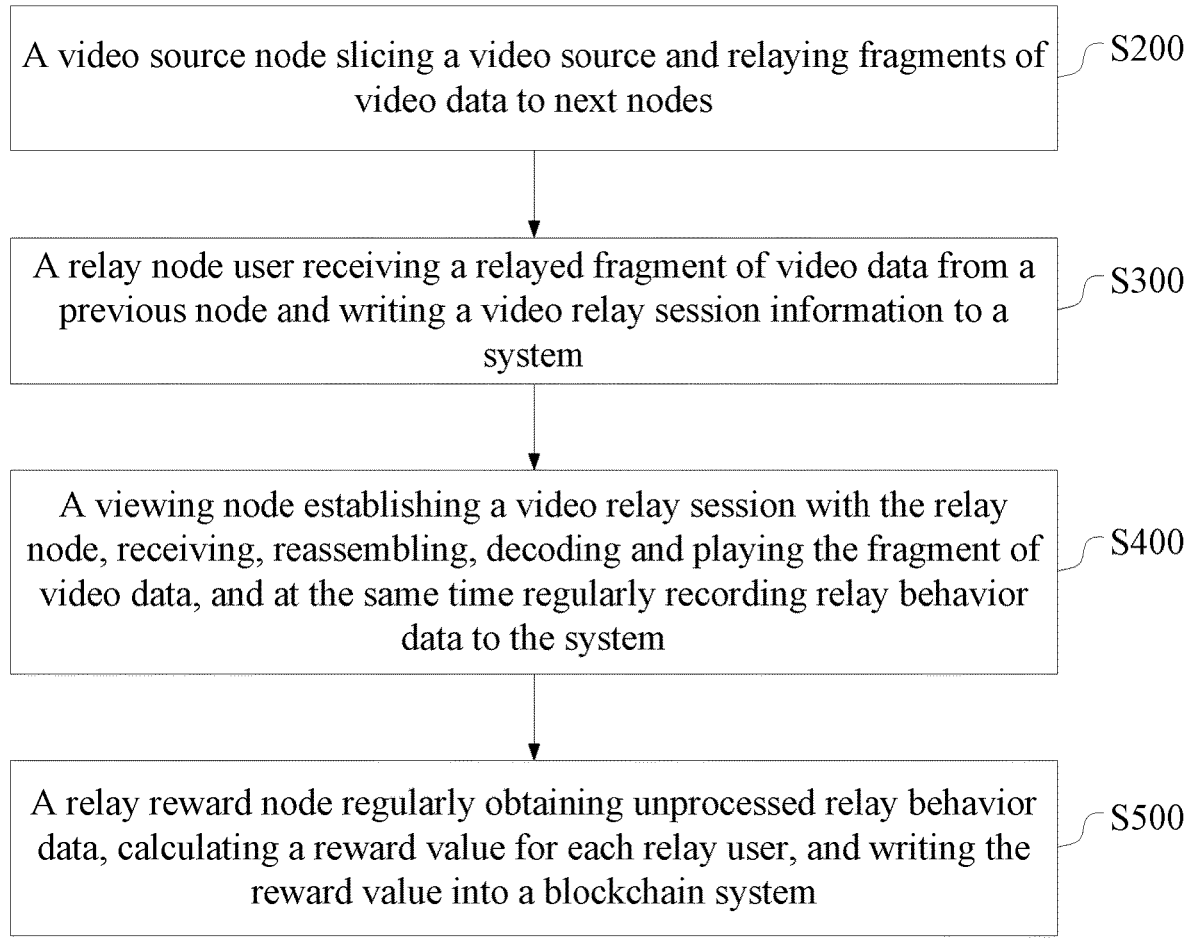
FIG. 1 illustrates a flowchart of a method for preventing a fraudulent video relay according to an embodiment of the disclosure.

FIG. 1 illustrates a flowchart of a method for preventing a fraudulent video relay according to an embodiment of the disclosure.

As shown in FIG. 1, in this embodiment, the method for preventing the fraudulent video relay provided by the disclosure comprises:

S200: a video source node slicing a video source and relaying fragments of video data to next nodes;

S300: a relay node user receiving a relayed fragment of video data from a previous node and writing a video relay session information into a system;

S400: a viewing node establishing a video relay session with the relay node, receiving, reassembling, decoding, and playing the fragment of video data, and at the same time regularly recording relay behavior data to the system;

S500: a relay reward node regularly obtaining unprocessed relay behavior data, calculating a reward value for each relay user, and writing the reward value into a blockchain system.

Figure 2:
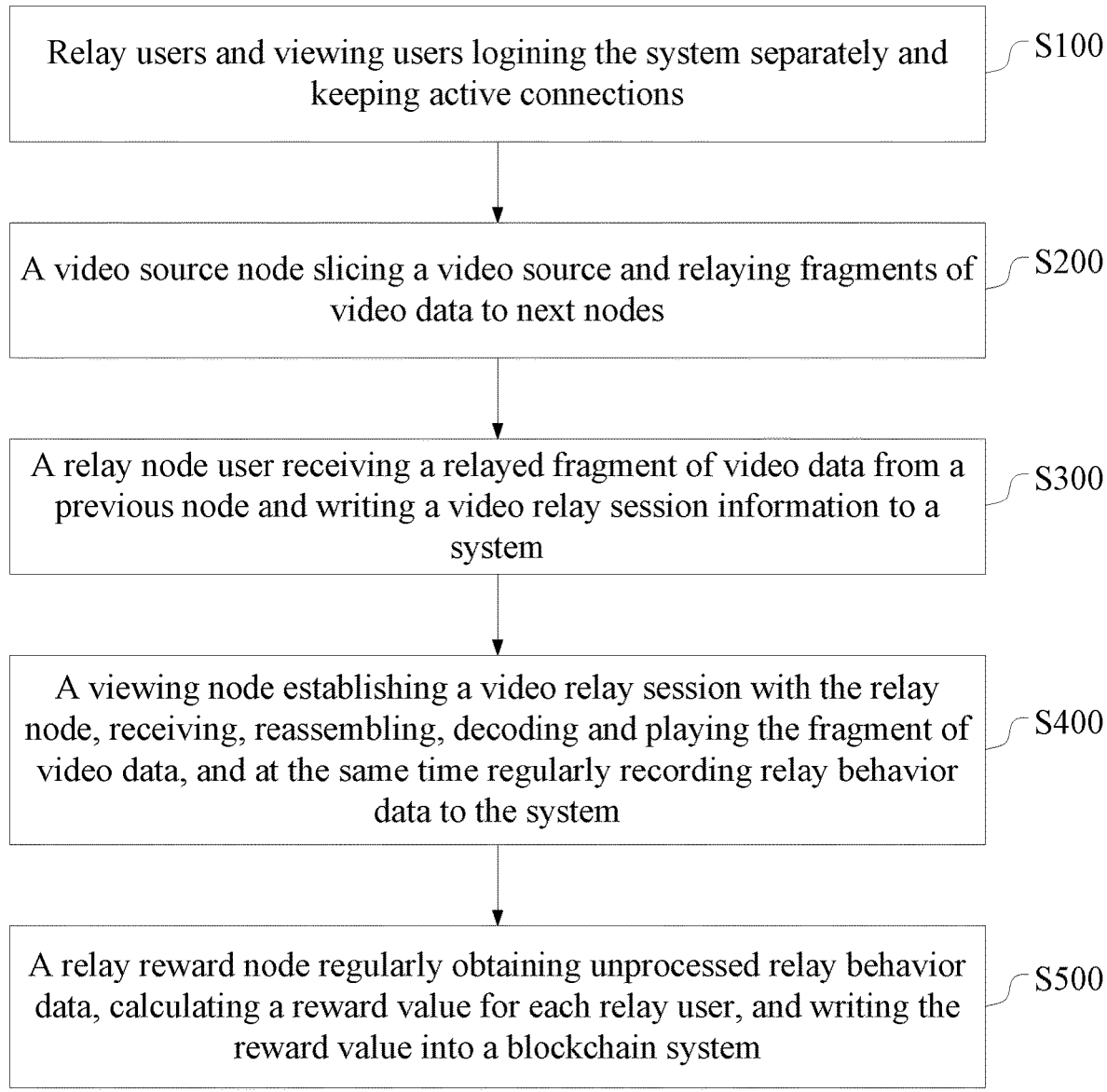
FIG. 2 illustrates a flowchart of a further embodiment of the method shown in FIG. 1.

FIG. 2 illustrates a flowchart of a further embodiment of the method shown in FIG. 1.

As shown in FIG. 2, in an embodiment, before step S200, the method further comprises:

S100: relay users and viewing users logining the system separately and keeping active connections.

Figure 3:
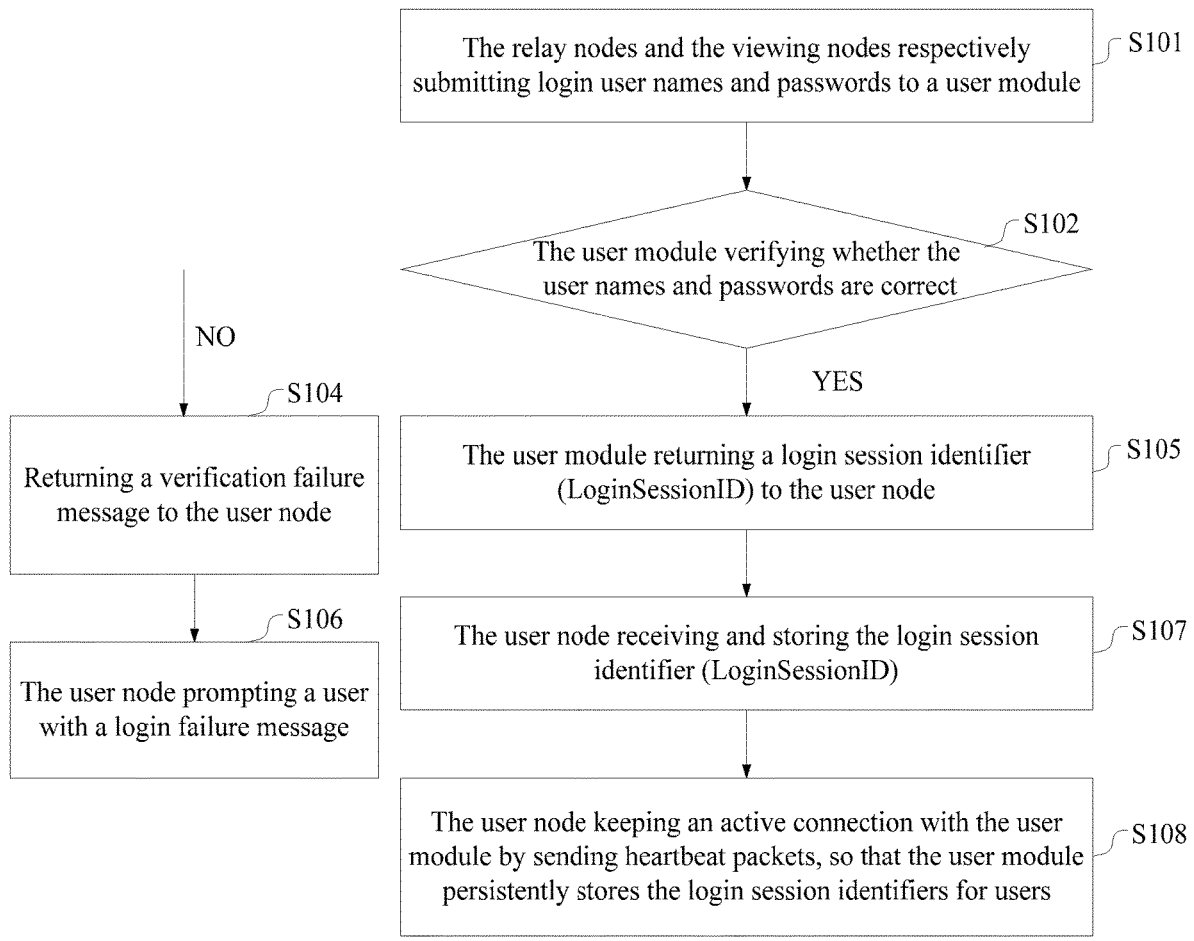
FIG. 3 illustrates a flowchart of a embodiment of step S100 in the method shown in FIG. 2.

FIG. 3 illustrates a flowchart of a embodiment of step S100 in the method shown in FIG. 2.

As shown in FIG. 3, in an embodiment, step S100 further comprises:

S101: the relay nodes and the viewing nodes respectively submitting login user names and passwords to a user module;

S102: the user module verifying whether the user names and passwords are correct:

if not, proceeding to step S104: returning a verification failure message to the user node; and S106: the user node prompting a user with a login failure message;

if yes, proceeding to step S105: the user module returning a login session identifier (LoginSessionID) to the user node; and, S107: the user node receiving and storing the login session identifier (LoginSessionID); and S108: the user node keeping an active connection with the user module by sending heartbeat packets, so that the user module persistently stores the login session identifiers for users.

Figure 4:
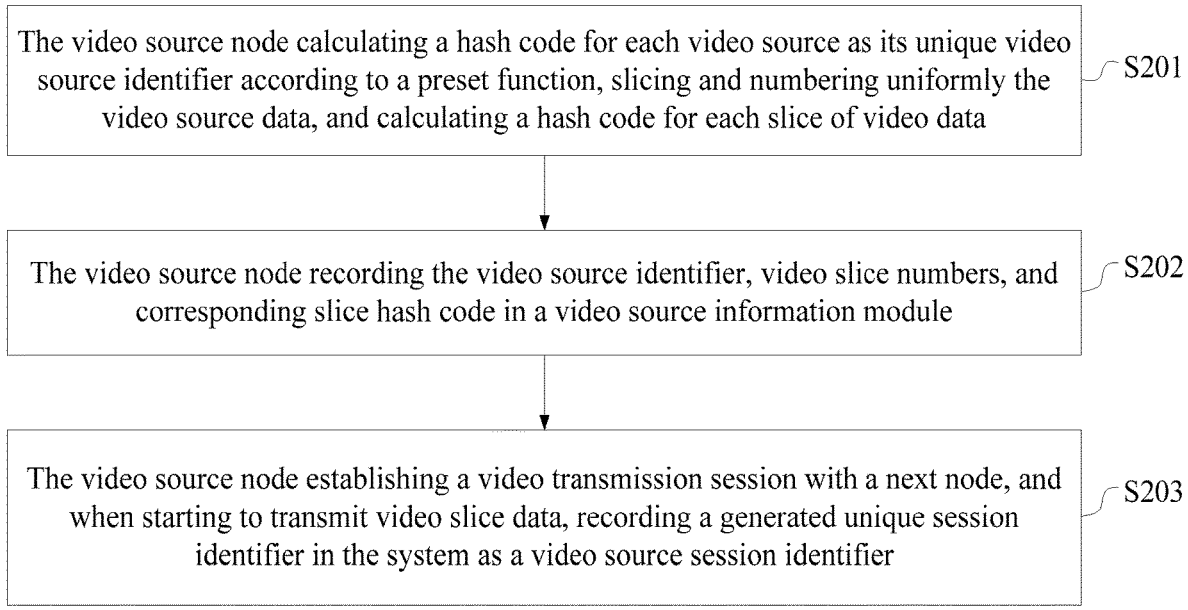
FIG. 4 illustrates a flowchart of a embodiment of step S200 in the method shown in FIG. 1.

FIG. 4 illustrates a flowchart of a embodiment of step S200 in the method shown in FIG. 1.

As shown in FIG. 4, in an embodiment, step S200 further comprises:

S201: the video source node calculating a hash code for each video source as its unique video source identifier according to a preset function, slicing and numbering uniformly the video source data, and calculating a hash code for each slice of video source data;

S202: the video source node recording information comprising the video source identifier (SourceID), video slice numbers (VNumber), and corresponding slice hash code ($Hash_{number}$) in a video source information module; wherein the information is represented as (SourceID, VNumber, $Hash_{number}$);

S203: the video source node establishing a video transmission session with a next node, and when starting to transmit video slice data, recording a generated unique session identifier in the system as a video source session identifier (CurrentSessionID); wherein the recorded information is represented as (SourceID, CurrentSessionID).

Figure 5:
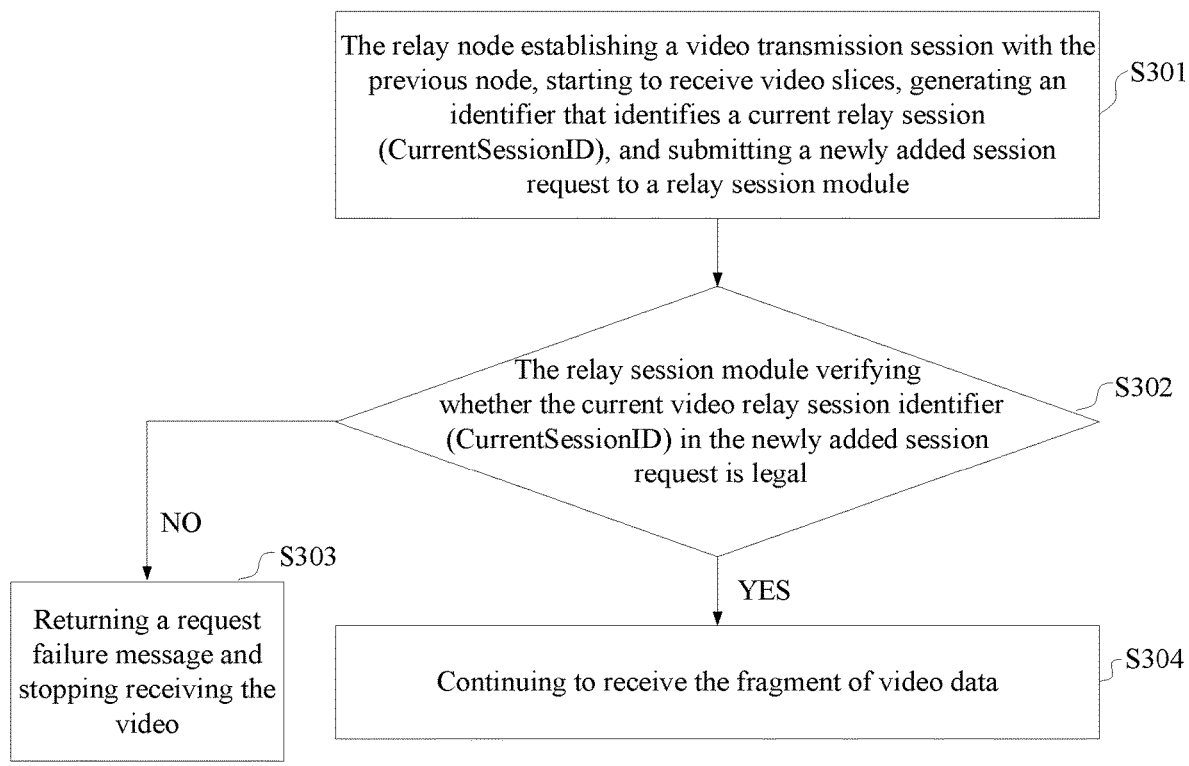
FIG. 5 illustrates a flowchart of a embodiment of step S300 in the method shown in FIG. 1.

FIG. 5 illustrates a flowchart of a embodiment of step S300 in the method shown in FIG. 1.

As shown in FIG. 5, in an embodiment, step S300 further comprises:

S301: the relay node establishing a video transmission session with the previous node, starting to receive video slices, generating an identifier that identifies a current relay session (CurrentSessionID), and submitting a newly added session request to a relay session module; wherein the request comprises a current relay session identifier and a video source identifier, represented as (CurrentSessionID, SourceID);

S302: the relay session module verifying whether the current video relay session identifier (CurrentSessionID) in the newly added session request is legal:

if not, proceeding to step S303: returning a request failure message and stopping receiving the video; and if yes, proceeding to step S304: continuing to receive the fragment of video data.

Figure 6:
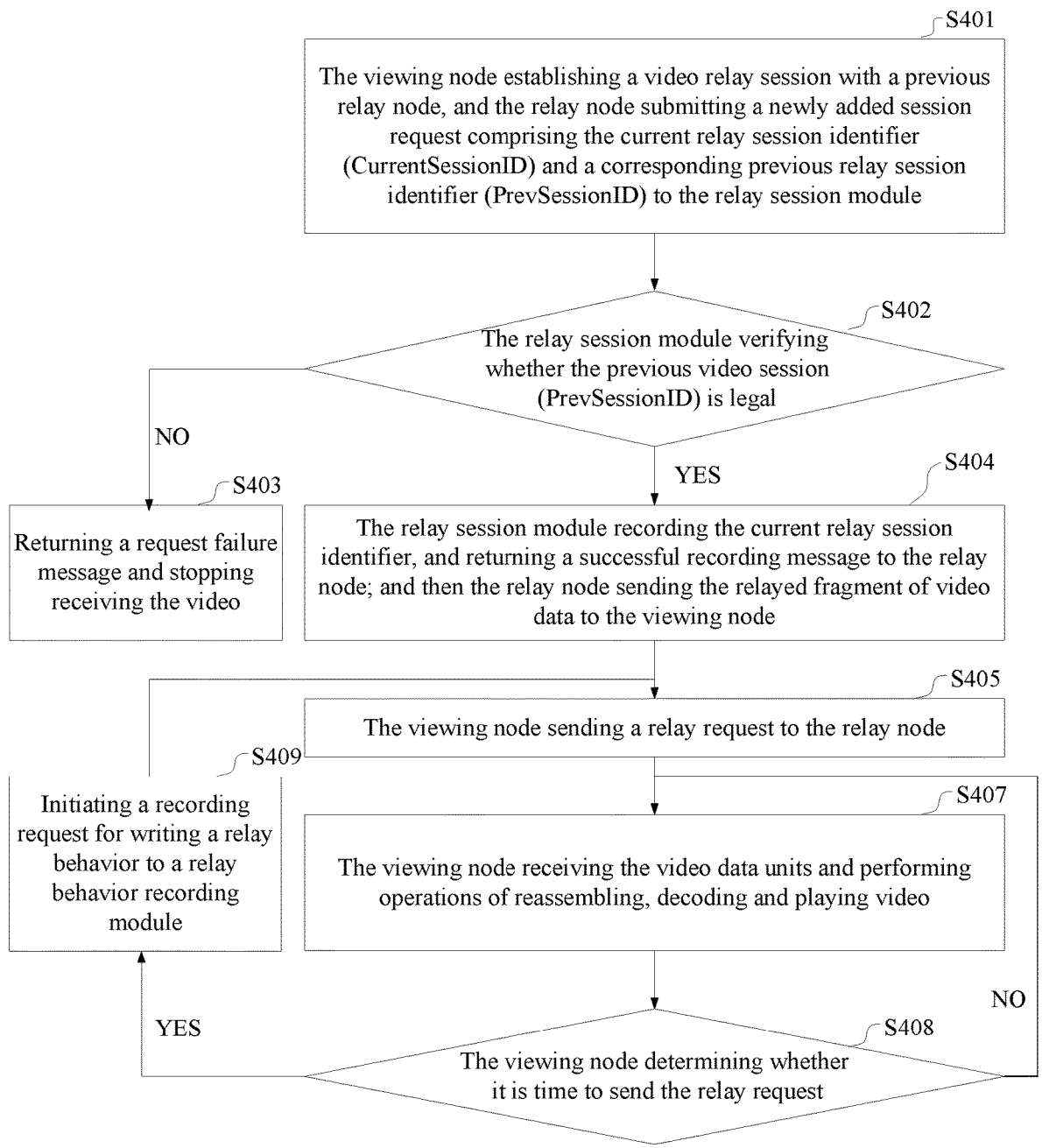
FIG. 6 illustrates a flowchart of a embodiment of step S400 in the method shown in FIG. 1.

FIG. 6 illustrates a flowchart of a embodiment of step S400 in the method shown in FIG. 1.

As shown in FIG. 6, in an embodiment, step S400 further comprises:

S401: the viewing node establishing a video relay session with a previous relay node, and the relay node submitting a newly added session request comprising the current relay session identifier (CurrentSessionID) and a corresponding previous relay session identifier (PrevSessionID) to the relay session module; wherein the request comprises the current video relay session identifier (CurrentSessionID), the previous relay video session identifier (PrevSessionID) corresponding to the current session, and a login session identifier of the viewing user (LoginSessionID), represented as (PrevSessionID, CurrentSessionID, LoginSessionID);

S402: the relay session module verifying whether the previous video session (PrevSessionID) is legal:

if not, proceeding to step S403: returning a request failure message and stopping receiving the video;

if yes, proceeding to step S404: the relay session module recording the current relay session identifier (CurrentSessionID) in the relay session module, and returning a successful recording message to the relay node, and then the relay node sending the relayed fragment of video data to the viewing node; and S405: the viewing node sending a relay request to the relay node to request the relay node to continue to relay a next relay period threshold duration to the viewing node (if the relay period threshold is 5 minutes, request to continue to relay for 5 minutes); wherein the request information mainly comprises a current relay video session identifier (CurrentSessionID), a maximum video slice number of a previous relay (CurrentVNumber), a login identifier of the viewing user (LoginSessionID), and a time point of the current relay request (RequestTimestamp); and S407: the viewing node receiving the fragment of video data and performing operations of reassembling, decoding and playing video; and S408: the viewing node determining whether it is time to send the relay request, that is, within a time interval less than a relay period threshold since a previous relay request was sent (if the threshold is 1 minute, the interval should be 55 seconds or 58 seconds and other time intervals less than 1 minute):

if not, proceeding to step S407;

if yes, proceeding to step S409: the viewing node initiating a recording request for writing a relay behavior to a relay behavior recording module; and proceeding to step S405.

Figure 7:
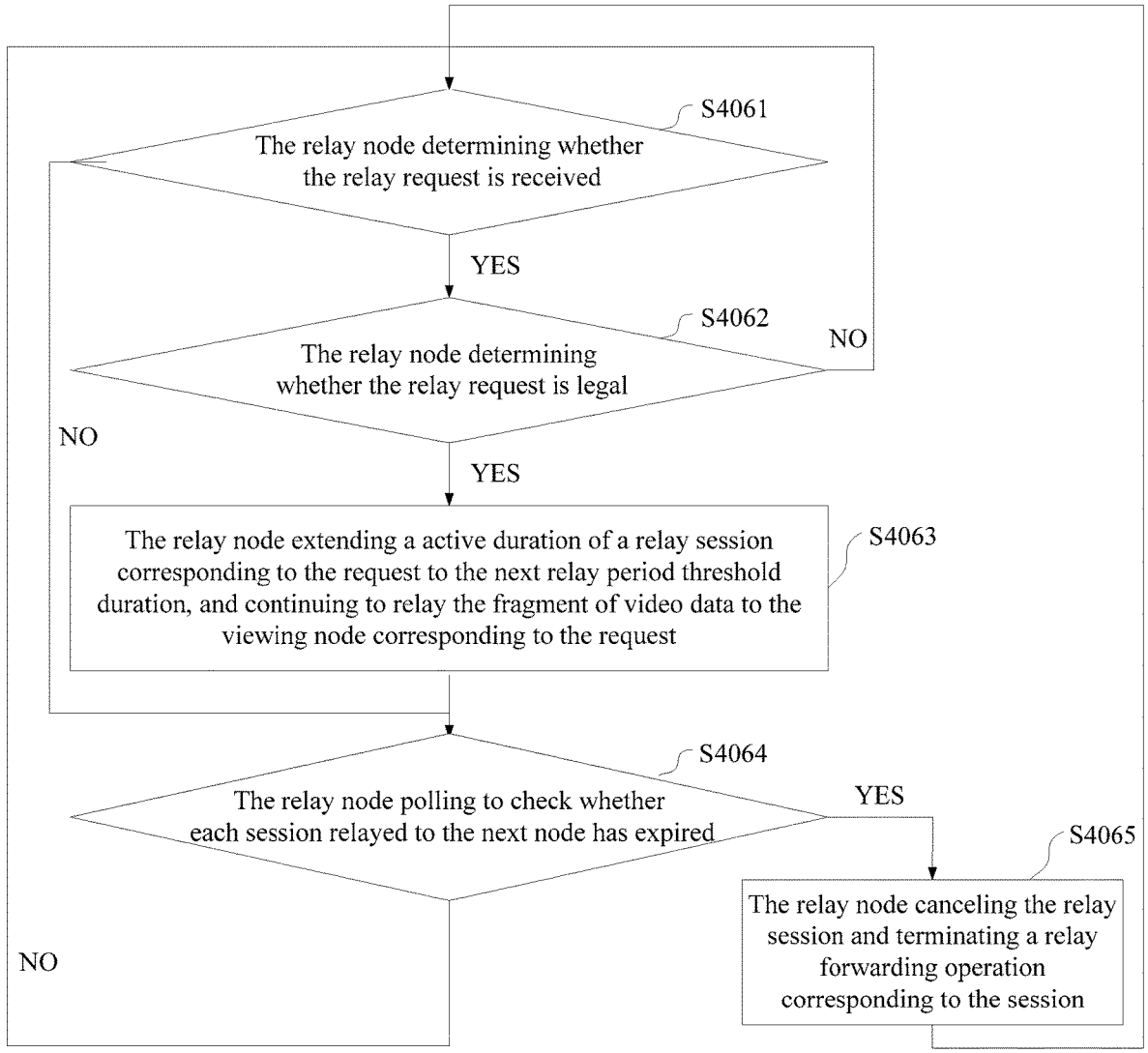
FIG. 7 illustrates a flowchart of a embodiment of steps after step S405 in the method shown in FIG. 6.

FIG. 7 illustrates a flowchart of a embodiment of steps after step S405 in the method shown in FIG. 6.

As shown in FIG. 7, in an embodiment, the following steps should be performed after step S405:

S4061: the relay node determines whether the relay request is received:

if yes, the process proceeds to step S4062: the relay node determines whether the relay request is legal based on whether the current video relay session identifier (CurrentSessionID) of the request exists:

if it does not exist, the process returns to step S4061;

if it exists, the process proceeds to step S4063: the relay node extends a active duration of a relay session corresponding to the request to the next relay period threshold duration (if the threshold is 5 minutes, extending 5 minutes), and continues to relay the fragment of video data to the viewing node corresponding to the request; and proceeds to step S4064;

if not, the process proceeds to S4064: the relay node polls to check whether each session relayed to the next node has expired:

if yes, the process proceeds to step S4065: the relay node cancels the relay session, and terminates a relay forwarding operation corresponding to the session; and the process proceeds to step S4061;

if not, the process returns to step S4061.

Figure 8:
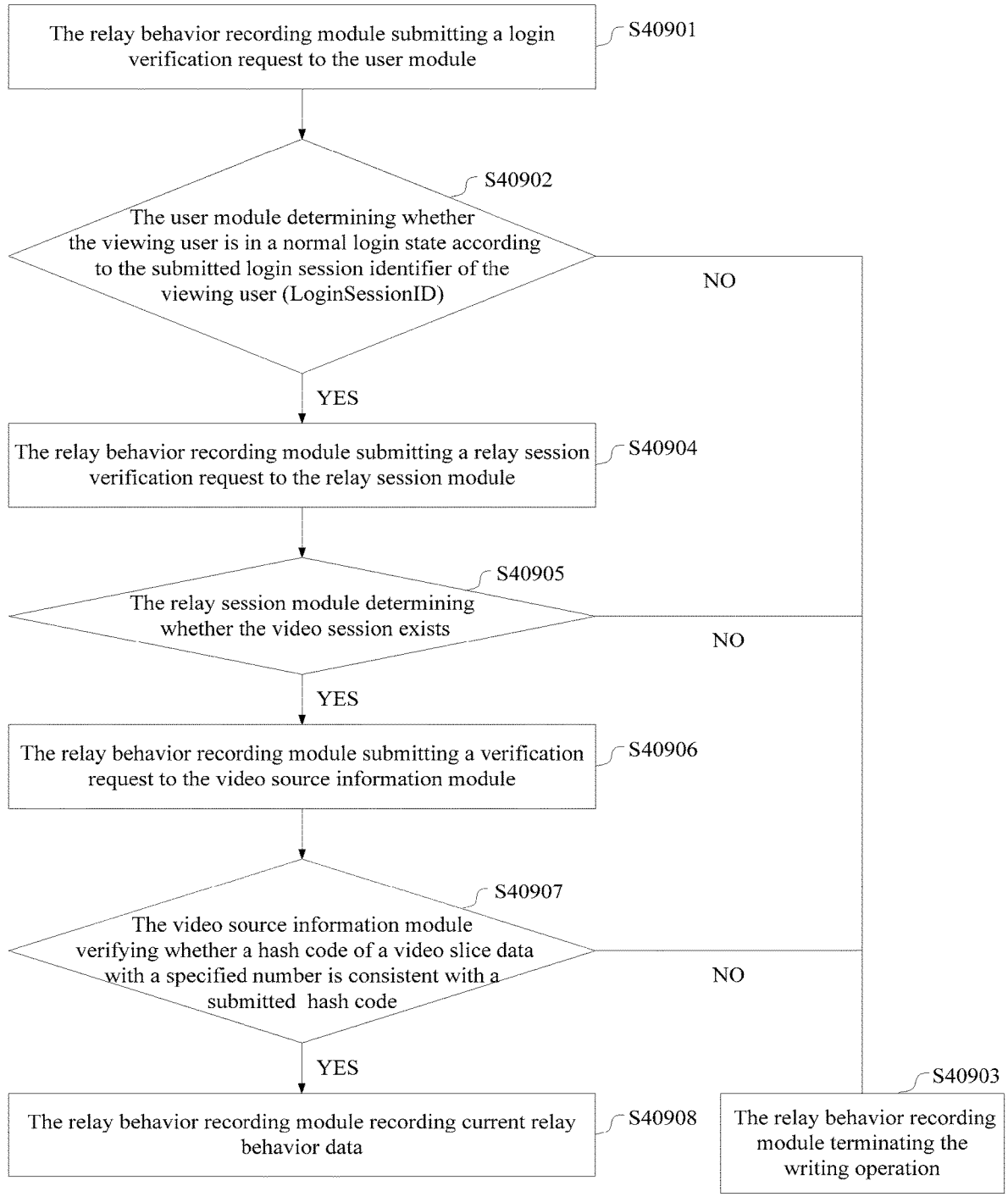
FIG. 8 illustrates a flowchart of a embodiment of step S409 in the method shown in FIG. 6.

FIG. 8 illustrates a flowchart of a embodiment of step S409 in the method shown in FIG. 6.

As shown in FIG. 8, in an embodiment, step S409 further comprises:

S40901: the relay behavior recording module submitting a login verification request to the user module;

S40902: the user module determining whether the viewing user is in a normal login state according to the submitted login session identifier of the viewing user (LoginSessionID):

if not, proceeding to step S40903: the relay behavior recording module terminating the writing operation;

if yes, proceeding to step S40904: the relay behavior recording module submitting a relay session verification request to the relay session module; wherein the request comprises: the current video relay session identifier (CurrentSessionID) and the previous video relay session identifier (PrevSessionID); and S40905: the relay session module determining whether the video session exists:

if not, proceeding to step S40903;

if yes, proceeding to step S40906: the relay behavior recording module submitting a verification request to the video source information module; wherein the request comprises: the current video transmission session identifier (CurrentSessionID), the video source identifier (SourceID), a current received video slice number (VNumber) and a corresponding hash code ($Hash_{number}$); and S40907: the video source information module verifying whether a hash code of a video slice data with a specified number is consistent with a submitted hash code:

if not, proceeding to step S40903;

if yes, proceeding to step S40908: the relay behavior recording module recording current relay behavior data; wherein the relay behavior data comprises: a viewing user name (ViewLoginName), a relay user name (RelayLoginName), a relay time point (RelayTimestamp), a current relay session identifier (CurrentSessionID), and a video source identifier (SourceID).

As described in step S500, in one embodiment, the relay reward node regularly obtains unprocessed relay behavior data to calculate a reward value for each relay user, and writes the reward value into the blockchain system. The specific steps of step S500 comprises:

First, defining a reward calculation formula of each relay node (assuming $i^{th}$ relay node) as:

$$reward_i = r_i * reward_{base} * time * bitrate$$

wherein, $reward_{base}$ is a reward base number for providing a unit bandwidth in units of yuan/GB or cent/GB, i.e., obtained reward amount or reward points per GB of provided traffic;

wherein, $r_i$ is a reward coefficient of $i^{th}$ relay node;

time is a relay period duration of the current relay record (such as 5 minutes);

bitrate is a bit rate of the current relay video (such as 1 mb/s);

Second, defining a relay receiving user concentration ratio $f_u$ of a certain relay user per unit time as:

$$f_u = \frac{s}{n} - 1$$

wherein, s is a total number of relay sessions (Session) relayed and distributed by the relay user to the next viewing users per unit time;

n is an independent user quantity of viewing users when the relay user is relaying to the next viewing users per unit time, which is also a total number of all viewing users after deduplication;

assuming that a relay user A has relayed and forwarded videos to a viewing user B three times in a unit time (e.g. one month), a relay independent receiving user quantity of A (n) is still counted as 1, and a total number of relay sessions (s) is counted as 3, so the relay receiving user concentration ratio $f_u$ of A is 2;

third, defining an average receiving duration of next relay forwarding viewing users corresponding to a previous relay session identifier (PrevSessionID) of a certain relay user as:

$$\bar{t} = \frac{1}{n}\sum_{k=0}^{n} t_i$$

wherein, $t_i$ is a receiving duration of $i^{th}$ viewing user corresponding to the relay session identifier (PrevSessionID);

furthermore, defining a receiving video duration concentration ratio $f_t$ of the viewing users when a certain relay user relay a certain session (PrevSessionID) for $i^{th}$ time as:

$$f_t = \frac{t_{max}}{\bar{t}} - 1$$

wherein, $t_{max}$ is a maximum receiving duration of the viewing users corresponding to the current relay session (PrevSessionID);

$\bar{t}$ is an average receiving duration of each viewing user corresponding to the relay session (PrevSessionID);

finally, defining $i^{th}$ relay reward coefficient of a certain relay user as:

$$r_i = \frac{1}{e^{f_u^2}} * \frac{1}{e^{f_t^2}}$$

therefore, defining a final reward calculation formula for a certain relay node as (assuming that a total of n forwardings are performed):

$$reward = \sum_{i=0}^{n} \frac{1}{e^{f_u^2}} * \frac{1}{e^{f_t^2}} * reward_{base} * time_i * bitrate$$

wherein, $time_i$ is a relay duration of $i^{th}$ relay record of a certain relay node; and the relay reward node regularly obtaining unprocessed relay behavior data from the relay behavior recording module, calculating a reward value of the relay node according to the above formula, and writing the reward value into the blockchain system so that the system can reward the relay user.

Figure 9:
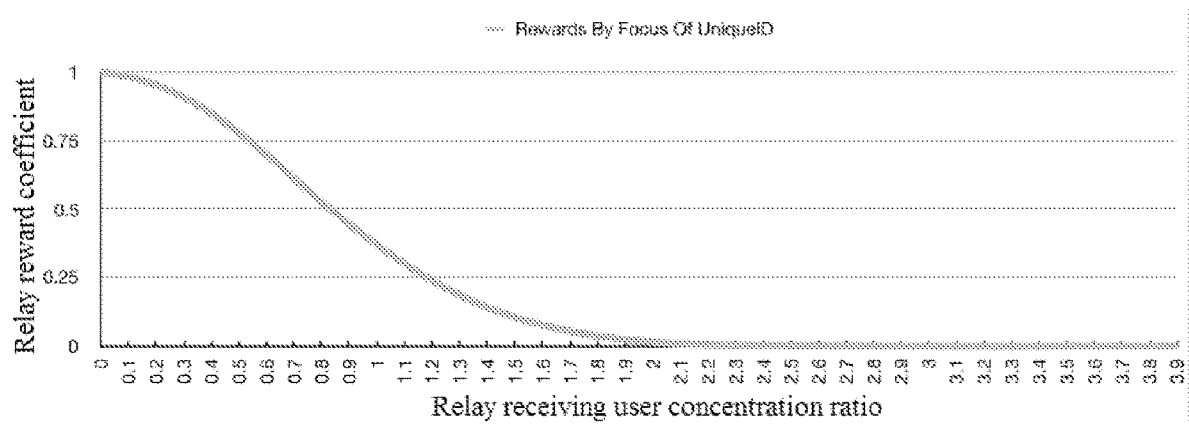
FIG. 9 illustrates a diagram of the relationship between the relay reward coefficient and the relay receiving user concentration ratio (when $f_t=0$) according to an embodiment of the disclosure.

FIG. 9 illustrates a diagram of the relationship between the relay reward coefficient and the relay receiving user concentration ratio (when $f_t$=0) according to an embodiment of the disclosure.

As shown in FIG. 9, in an embodiment, when the relay receiving user receiving duration concentration ratio $f_t$=0, the relay reward coefficient $r_i$ decreases sharply with the increase of $f_u$ between the relay reward coefficient $r_i$ and the relay receiving user concentration ratio $f_u$. If the fraudulent relay node only relays data to the preset few known fraudulent viewing nodes, the increase in the relay receiving user concentration ratio $f_u$ will lead to a sharp drop in its reward coefficient $r_i$, which will make its rewards become negligible, thus ensuring the interests of normal relay nodes.

Figure 10:
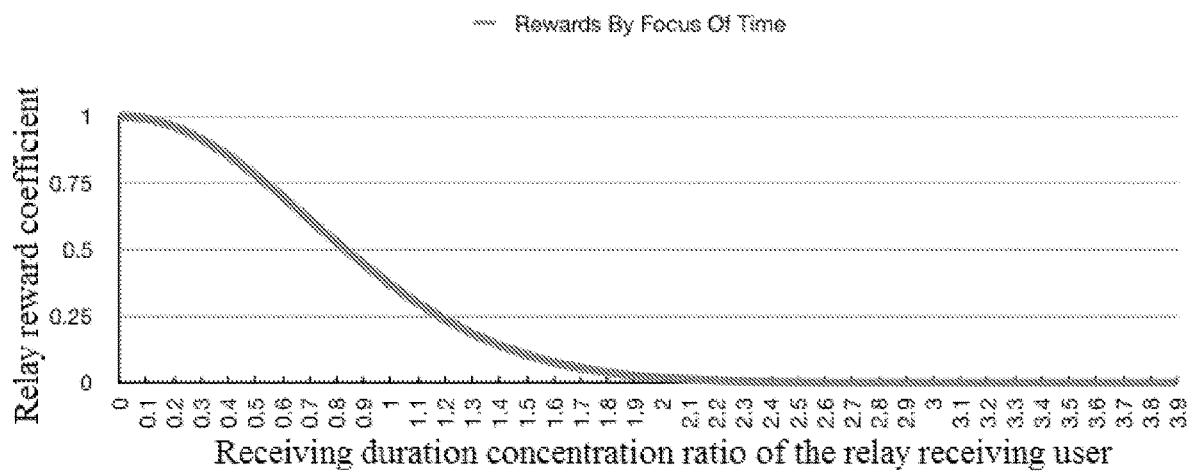
FIG. 10 illustrates a diagram of the relationship between the relay reward coefficient and the receiving duration concentration ratio of the relay receiving user (when $f_u=0$) according to an embodiment of the disclosure.

FIG. 10 illustrates a diagram of the relationship between the relay reward coefficient and the receiving duration concentration ratio of the relay receiving user (when $f_u$=0) according to an embodiment of the disclosure.

As shown in FIG. 10, in an embodiment, when the relay receiving user concentration ratio $f_u$=0, the relay reward coefficient $r_i$ decreases sharply with the increase of $f_t$ between the relay reward coefficient $r_i$ and the receiving duration concentration ratio $f_t$ of the relay receiving user. If the fraudulent relay node, in order to avoid being punished due to a excessively high receiving user concentration ratio $f_u$, starts to deliberately relay the video to most of the viewing nodes, then immediately terminates the relay to most of the viewing nodes, and only retains relaying data to the preset few known fraudulent viewing nodes, its reward coefficient $r_i$ will drop sharply due to the increase in the receiving duration concentration ratio $f_t$ of the relay receiving user, so that its reward will also drop sharply, thus ensuring the interests of normal relay nodes.

Figure 11:
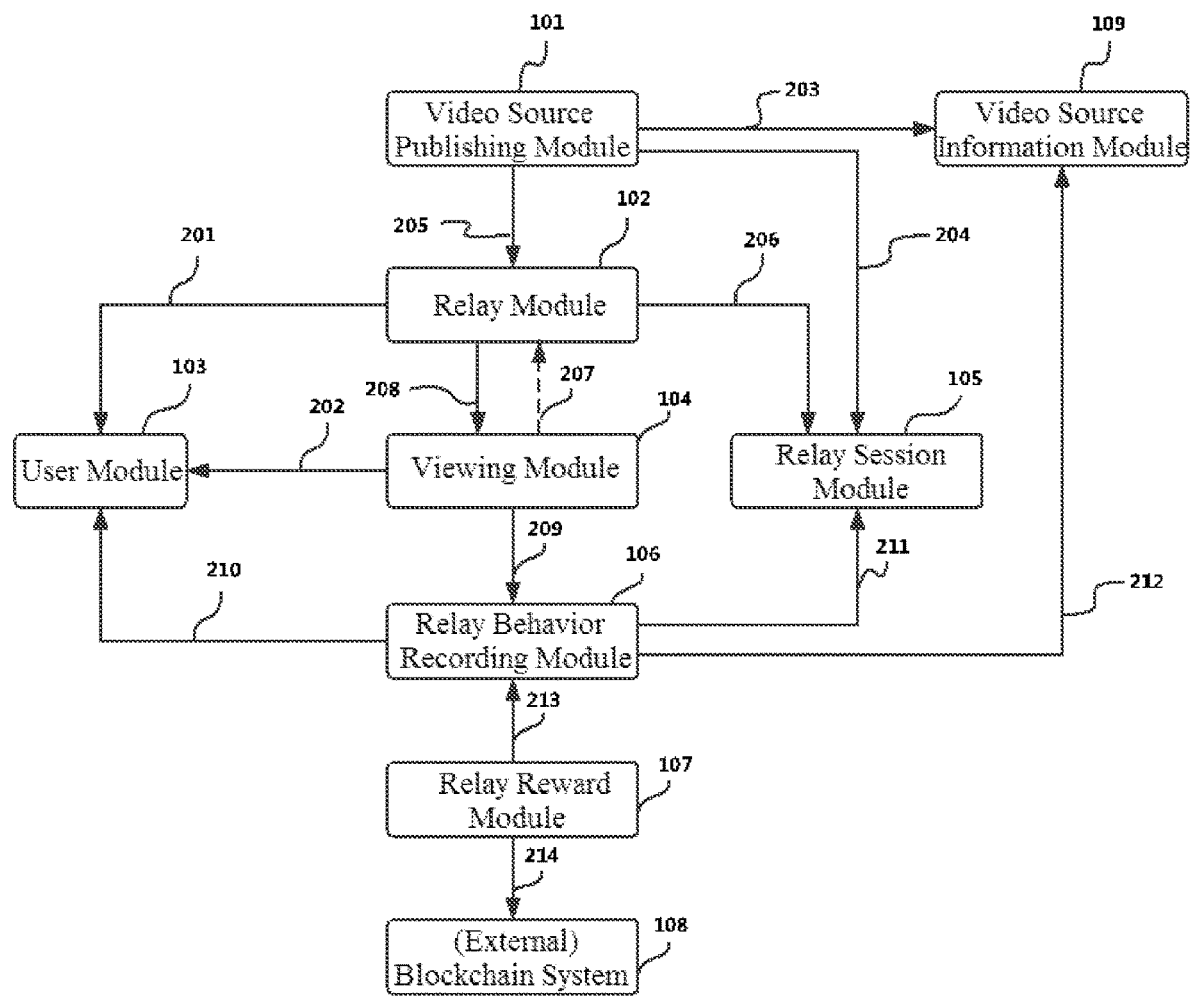
FIG. 11 illustrates a schematic structural diagram of a system for preventing a fraudulent video relay provided by an embodiment of the disclosure.

FIG. 11 illustrates a schematic structural diagram of a system for preventing a fraudulent video relay provided by an embodiment of the disclosure.

The modules shown in FIG. 11, except for the video source publishing module, which needs to be deployed on the video source node, the remaining modules can be deployed on any node on the distributed network.

As shown in FIG. 11, in this embodiment, the system for preventing the fraudulent video relay provided by the disclosure consists of a video source publishing module 101, a relay module 102, a user module 103, a viewing module 104, a relay session module 105, and a relay behavior recording module 106, a relay reward module 107, a video source information module 109 and a (external) blockchain system 108.

Wherein, the video source publishing module 101 is configured for publishing operations of various live and on-demand video streams; wherein the publishing operations comprise video hash coding, video data slicing, calculation and reception of corresponding hash codes, and operations of receiving connection verification, establishment and video data relay of next video receiving nodes (such as a viewing node or a relay node).

The video source verification module 109 is configured for a hash verification of a specified video stream data slice.

The relay module 102 is configured to receive video data from a previous module (such as the video source publishing module) and relay the video data to the viewing module 103.

The viewing module 103 is configured to receive and play videos.

The user module 104 is configured for identity authentication, login session retention and verification of the relay users and the viewing users.

The relay session module 105 is configured to record and verify relay and forwarding chains of the relay module 102 and the viewing module 103.

The relay behavior recording module 106 is configured to verify and record relay behaviors of the relay users.

The relay reward module 107 is configured to analyze and reward the relay behaviors, and record reward results in the (external) blockchain system 108.

In this embodiment, each of the above-mentioned modules is configured as a software program in each corresponding node, thereby implementing the system for preventing the fraudulent video relay according to the previous method. In more embodiments, the above-mentioned modules can also be configured as hardware devices dedicated to preventing the fraudulent video relay according to actual needs, or a combination of software and hardware that can be understood by those skilled in the art, which can achieve the same technical effect.

The operation process of the system for preventing the fraudulent video data relay is as follows:

201: the relay module 102 submits a relay user name and password to the user module 103 for user login identity authentication; the user module 103 performs a verification and then returns a login session identifier of the relay user to the relay module 102, and the relay module 102 regularly submits a heartbeat keep-alive request to the user module 103 to maintain the login session;

202: the viewing module 104 submits a viewing user name and password to the user module 103 for user login identity authentication; the user module 103 performs a verification and then returns a login session identifier of the viewing user to the viewing module 104, and the viewing module 104 regularly submits a heartbeat keep-alive request to the user module 103 to maintain the login session;

step 203: the video source publishing module 101 performs a hash calculation for the video source according to a preset function to obtain a unique video source identifier (SourceID), and at the same time slices and numbers uniformly the video source data, and calculates a hash code for each slice of video data source, and records the above information triples (a video source identifier, a video slice number, and a slice hash code) in the video source information module 109;

204: the video source publishing module 101 submits information comprising a generated current video relay session identifier (CurrentSessionID) and the video source identifier (SourceID) to the relay session Module 105 for storage after the video source publishing module 101 and the next module (assumed to be the relay module 102) has established a video relay session;

205: the video source publishing module 101 starts the transmission of the fragment of video data after the video source publishing module 101 has established a video relay session with the relay source module (such as the video source publishing module 101); wherein the fragment of video data comprises the current video relay session identifier (CurrentSessionID), video slice data (VData), and slice numbers (VNumber);

206: after the relay module 102 has established a video relay session with the viewing module 104, the relay module 102 submits the current video relay session identifier (CurrentSessionID) and a video transmission session identifier generated in step 204 as a previous video relay session identifier (PrevSessionID), together with the video source identifier (SourceID), to the relay session module 105 to verify a legality of the relay video session:

if the relay session module 105 cannot find a corresponding legal video session from the system according to the submitted previous video relay session identifier (PrevSessionID) and the video source identifier (SourceID), the relay session module 105 returns a verification failure message to the relay module 102, and then the relay module 102 terminates video relay;

if the relay session module 105 finds a corresponding legal video session from the system according to the submitted previous video relay session identifier (PrevSessionID) and the video source identifier (SourceID), the relay session module 105 records the current video relay session identifier (CurrentSessionID) and returns a success message to the relay module 102, and then the relay module 102 continues to transmit video, and the following steps continues to be performed;

207: the viewing module 104 regularly (i.e., every other relay period, such as 5 minutes) submits a relay request to the relay module 102; wherein the request comprises information comprising the current video relay session identifier (CurrentSessionID) generated in step 206 and a starting number of the video slices to be transmitted (VNumber);

208: the relay module 102 verifies the relay request received in step 207:

if a verification is passed, the relay module 102 continues to relay the fragment of video data to the viewing module 104, and steps 207 and 208 are repeated to achieve continuous video relay;

if the verification fails, the relay module 102 stops relaying the fragment of video data to the viewing module 104 to terminate following operations;

209: the viewing module 104 regularly (the same as the relay period in step 207, such as 5 minutes) submits video relay behavior data to the relay behavior module 106; wherein the relay behavior data comprises the relay and viewing user login identifiers (such as account name), relay and viewing user login session identifiers, current video slice number, hash code of current video slice, and current relay session identifier;

210: the relay behavior recording module 106 submits the viewing and relay user login identifiers received in step 209 to the user module 103 to verify whether login status of the users are normal:

if the user module 103 cannot find a corresponding login session from an online user session table according to a submitted user login identifier, the user module 103 returns a verification failure message to the relay behavior recording module 106, and then the relay behavior recording module 106 cancels the current relay behavior recording request and returns immediately;

if the user module 103 can find the corresponding session from the online user session table according to the submitted user login identifier, the user module 103 returns a verification success message to the relay behavior recording module 106, and the following steps continues to be performed;

211: the relay behavior recording module 106 submits the relay session identifiers received in step 209 to the relay session module 105 for verification:

if the relay session module 105 cannot find a corresponding relay session identifier (CurrentSessionID) in a relay session storage, the relay session module 105 returns a verification failure message to the relay behavior recording module, and then the relay behavior recording module cancels the current relay behavior recording request to terminate the subsequent steps immediately;

if the relay session module 105 can find a corresponding relay session identifier (CurrentSessionID) in the relay session storage, the relay session module 105 returns a verification success message to the relay behavior recording module 106, and the following steps continues to be performed;

212: the relay behavior recording module 106 submits the video source identifier (SourceID), the video slice number (VNumber) and a hash code (Hash$_{number}$) of the video slice data corresponding to the number received in step 209 to the video source information module 109 for verification:

if the video source information module 109 fails to verify the request, the video source information module 109 returns a verification failure message to the relay behavior recording module 106, and then the relay behavior recording module 106 cancels the current relay behavior recording request to immediately terminate subsequent operation steps;

if the video source information module 109 successfully verifies the request, the video source information module 109 returns a verification success message to the relay behavior recording module 106, and then the relay behavior recording module 106 stores the current relay behavior record;

213: the relay reward module 107 regularly obtains unprocessed newly added relay behavior data from the relay behavior recording module 106; and 214: the relay reward module 107 analyzes the relay behavior data obtained in step 213, calculates a relay reward coefficient for a corresponding relay user to calculate relay reward points, and finally writes the relay reward points into the (external) blockchain system 108.

Figure 12:
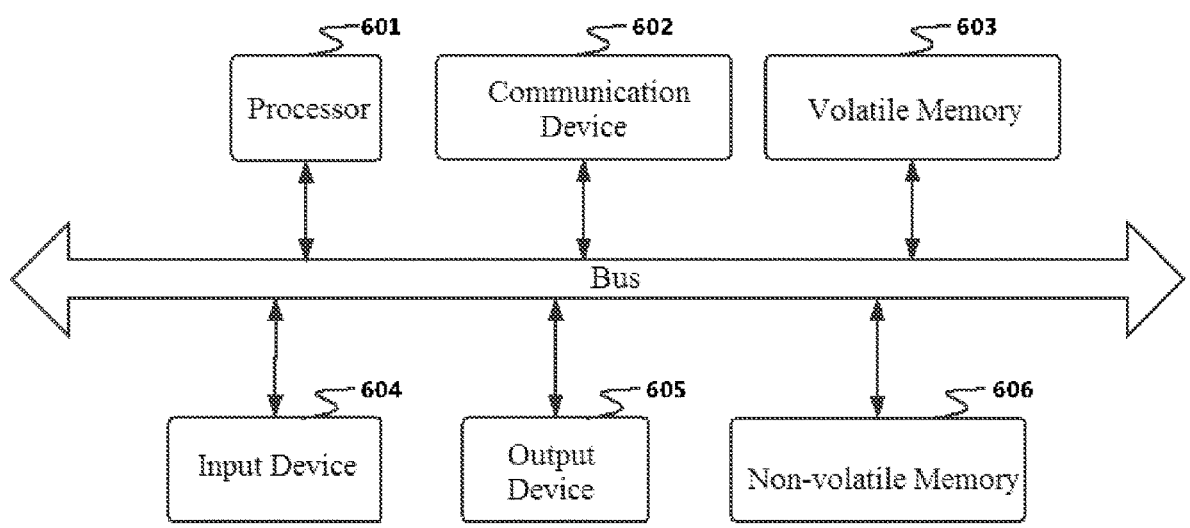
FIG. 12 illustrates a schematic structural diagram of a computing device provided by an embodiment of the disclosure.

FIG. 12 illustrates a schematic structural diagram of a computing device provided by an embodiment of the disclosure.

The computing device may comprise one or more central processing units 601 (CPU), which can execute various logics and actions according to instructions in the volatile memory 603 or loaded from the non-volatile memory 606 to the volatile memory 603, and communicate and interact with other Internet devices through a communication device 602. Wherein, the volatile memory 603 comprises read only memory (ROM) and random access memory (RAM). An input device 604 can comprise a keyboard, a mouse, a touch screen, etc. And an output device 605 can comprise a display device, such as a liquid crystal display (LCD), a cathode ray tube (CRT), various display screens, and speakers. The non-volatile memory 606 may comprise a hard disk, an optical disk, a semiconductor storage, a magneto-optical disk, and the like. The communication device 602 may comprise network interface devices such as a local area network card (LAN card), a wireless network card, and a modem.

A person of ordinary skill in the art can understand that all or part of the steps in the above embodiment can be implemented by hardware, or by a software program to instruct relevant hardware, wherein, the program can be stored in a computer-readable storage medium. The above-mentioned storage medium can be a read-only memory, a magnetic disk or an optical disk, etc.

The above are only the embodiments of the disclosure and are not intended to limit the disclosure. Any modification, equivalent replacement, improvement, etc. made within the spirit and principle of the disclosure should fall in the protection scope of the disclosure.

The invention claimed is:

1. A method for preventing a fraudulent video relay, comprising:

a video source node slicing a video source and relaying fragments of video data to next nodes;

a relay node user receiving a relayed fragment of video data from a previous node and writing a video relay session information to a system;

a viewing node establishing a video relay session with the relay node, receiving, reassembling, decoding and playing the fragment of video data, and at the same time regularly recording relay behavior data to the system; and a relay reward node regularly obtaining unprocessed relay behavior data, calculating a reward value for each relay user, and writing the reward value into a blockchain system, which comprises:

first, defining a reward calculation formula of each relay node as:

reward$_i$=r$_i$*reward$_{base}$*time*bitrate wherein, reward$_i$ is a reward base number for providing a unit bandwidth in units of yuan/GB or cent/GB, which is also an obtained reward amount or reward points per GB of provided traffic;

wherein, r$_i$ is a reward coefficient of i$^{th}$ relay node;

time is a relay period duration of the current relay record;

bitrate is a bit rate of the current relay video;

second, defining a relay receiving user concentration ratio f$_u$ of a certain relay user per unit time as:

$$f_u = \frac{s}{n} - 1$$

wherein, s is a total number of relay sessions relayed and distributed by the relay user to the next viewing users per unit time;

n is an independent user quantity of viewing users when the relay user is relaying to the next viewing users per unit time, which is also a total number of all viewing users after deduplication;

assuming that a relay user A has relayed and forwarded videos to a viewing user B three times in a unit time, a relay independent receiving user quantity of A (n) is still counted as 1, and a total number of relay sessions (s) is counted as 3, so the relay receiving user concentration ratio $f_u$ of A is 2;

third, defining an average receiving duration of next relay forwarding viewing users corresponding to a previous relay session identifier of a certain relay user as:

$$\bar{t} = \frac{1}{n}\sum_{i=0}^{n} t_i$$

wherein, $t_i$ is a receiving duration of $i^{th}$ viewing user corresponding to the relay session identifier;

furthermore, defining a receiving video duration concentration ratio $f_t$ of the viewing users when a certain relay user relay a certain session for $i^{th}$ time as:

$$f_t = \frac{t_{max}}{\bar{t}} - 1$$

wherein, $t_{max}$ is a maximum receiving duration of the viewing users corresponding to the current relay session;

$\bar{t}$ is an average receiving duration of each viewing user corresponding to the relay session;

finally, defining $i^{th}$ relay reward coefficient of a certain relay user as:

$$r_i = \frac{1}{e^{f_u2}} * \frac{1}{e^{f_t2}}$$

therefore, defining a final reward calculation formula for a certain relay node as:

$$reward = \sum_{i=0}^{n} \frac{1}{e^{f_u2}} * \frac{1}{e^{f_t2}} * reward_{base} * time_i * birate$$

wherein, $time_i$ is a relay duration of $i^{th}$ relay record of a certain relay node, and n is a total number of forwardings; and the relay reward node regularly obtaining unprocessed relay behavior data from the relay behavior recording module, calculating a reward value of the relay node according to the above formula, and writing the reward value into the blockchain system so that the system can reward the relay user.

2. The method for preventing a fraudulent video relay according to claim 1, further comprising:
relay users and viewing users logging into the system separately and keeping active connections before the video source node slicing the video source.

3. The method for preventing a fraudulent video relay according to claim 2, wherein the relay users and viewing users logging into the system separately and keeping active connections further comprises:
the relay nodes and the viewing nodes respectively submitting login user names and passwords to a user module;
the user module verifying whether the user names and passwords are correct:
if not, the user module returning a verification failure message to the user node, and the user node prompting a user with a login failure message, and then subsequent operations ending; and
if yes, the user module returning a login session identifier to the user node, and the user node receiving and storing the login session identifier, and keeping an active connection with the user module by sending heartbeat packets, so that the user module persistently stores the login session identifiers for users.

4. The method for preventing a fraudulent video relay according to claim 1, wherein the video source node slicing the video source and distributing the fragment of video data to next nodes further comprises:
the video source node calculating a hash code for each video source as its unique video source identifier according to a preset function, slicing and numbering uniformly the video source data, and calculating a hash code for each slice of video data;
the video source node recording information comprising the video source identifier, video slice numbers, and corresponding slice hash code in a video source information module; and
the video source node establishing a video transmission session with a next node, and when starting to transmit video slice data, recording a generated unique session identifier in the system as a video source session identifier.

5. The method for preventing a fraudulent video relay according to claim 1, wherein the relay node user receiving the relayed fragment of video data from the previous node and writing the video relay session information to the system further comprises:
the relay node establishing a video transmission session with the previous node, starting to receive video slices, generating an identifier that identifies a current relay session, and submitting a newly added session request to a relay session module;
the relay session module verifying whether the current video relay session identifier in the newly added session request is legal:
if not, returning a request failure message, and the relay node stopping receiving the video; and
if yes, the relay node continuing to receive the fragment of video data.

6. The method for preventing a fraudulent video relay according to claim 1, wherein the viewing node establishing the video relay session with the relay node, and receiving, reassembling, decoding and playing the fragment of video data, and at the same time regularly recording relay behavior data to the system further comprises:
the viewing node establishing a video relay session with a previous relay node, and the relay node submitting a newly added session request comprising the current relay session identifier and a corresponding previous relay session identifier to the relay session module;
wherein the request comprises the current video relay session identifier, the previous relay video session identifier corresponding to the current session, and a login session identifier of the viewing user;
the relay session module verifying whether the previous relay video session exists:
if not, returning a request failure message and stopping receiving the video;
if yes, the relay session module recording the current relay session identifier, and returning a successful recording message to the relay node, and then the relay node sending the relayed fragment of video data to the viewing node, and the following steps continuing to be performed;

the viewing node sending a relay request to the relay node to request the relay node to continue to relay a next relay period threshold duration to the viewing node; wherein request information mainly comprises a current relay video session identifier, a maximum video slice number of a previous relay, a login identifier of the viewing user, and a time point of the current relay request;

the viewing node receiving the fragment of video data and performing operations of reassembling, decoding and playing video; and the viewing node determining whether it is time to send the relay request, that is, within a time interval less than a relay period threshold since a previous relay request was sent:

if not, the viewing node continuing to wait and receiving the fragment of video data to perform the operations of reassembling, decoding and playing video; and if yes, the viewing node initiating a recording request for writing a relay behavior to a relay behavior recording module, and sending a relay request to the relay node.

7. The method for preventing a fraudulent video relay according to claim 6, further comprising:

the relay node determining whether the relay request is received after the viewing node sending the relay request to the relay node:

if yes, the relay code further determining whether the request is legal based on whether the current video relay session identifier of the request exists; if it does not exist, ignoring it; if it exists, the relay node extending a active duration of a relay session corresponding to the request to the next relay period threshold duration, and continuing to relay the fragment of video data to the viewing node corresponding to the request;

if not, the following operations continuing to be performed; and the relay node polling to check whether each session relayed to the next node has expired:

if yes, the relay node canceling the relay session, terminating a relay forwarding operation corresponding to the session, and returning to continue waiting for a next relay request or determining whether the relay session has expired; and if not, returning to wait for the next relay request or continue to check whether the relay session has expired.

8. The method for preventing a fraudulent video relay according to claim 7, wherein the relay node polling to check whether each session relayed to the next node has expired refers to determining whether any relay request from a specified video relay session is received within a time period exceeding a relay period threshold, if it is not received, the session is considered expired, otherwise the session is considered valid.

9. The method for preventing a fraudulent video relay according to claim 6, wherein the viewing node initiating a recording request for writing the relay behavior to the relay behavior recording module further comprises:

the relay behavior recording module submitting a login verification request to the user module, where the request comprises the login session identifier of the viewing user and a login session identifier of the relay user;

the user module determining whether the user is in a normal login state according to the submitted login session identifiers of the viewing user and the relay user:

if not, the relay behavior recording module terminating a write operation, and returning a failure message to terminate following operations;

if yes, the relay behavior recording module submitting a relay session verification request to the relay session module; wherein the request comprises: the current video relay session identifier and the previous video relay session identifier;

the relay session module determining whether the video session exists:

if not, the relay behavior recording module terminating the write operation, and returning a failure message to terminate following operations;

if yes, the relay behavior recording module submitting a verification request to the video source information module; wherein the request comprises: the current video transmission session identifier, the video source identifier, a current received video slice number and a corresponding hash code:

the video source information module verifying whether a hash code of a video slice data with a specified number is consistent with a submitted hash code:

if not, the relay behavior recording module terminating the write operation, and returning a failure message to terminate following operations; and if yes, the relay behavior recording module recording current relay behavior data; wherein the relay behavior data comprises: a viewing user name, a relay user name, a relay time point, a current relay session identifier, and a video source identifier.

10. A system for preventing a fraudulent video data relay, the system comprising:

a video source publishing module, configured for publishing operations of various live and on-demand video streams; wherein the publishing operations comprise video hash coding, video data slicing, calculation and reception of corresponding hash codes, and operations of receiving connection verification, establishment and video data relay of next video receiving nodes;

a video source verification module, configured for a hash verification of a specified video stream data slice;

a relay module, configured to receive video data from a previous module and relay the video data to a viewing module;

a viewing module, configured to receive and play videos;

a user module, configured for identity authentication, login session retention and verification of the relay users and the viewing users;

a relay session module, configured to record and verify relay and forwarding chains of the relay module and the viewing module;

a relay behavior recording module, configured to verify and record relay behaviors of the relay users; and a relay reward module, configured to analyze and reward the relay behaviors, and record reward results in the blockchain system;

wherein a complete process of the system comprises:

step 1. the relay module submitting a relay user name and password to the user module for user login identity authentication; the user module performing a verification and then returning a login session identifier of the relay user to the relay module, and the relay module regularly submitting a heartbeat keep-alive request to the user module to maintain the login session;

step 2. the viewing module submitting a viewing user name and password to the user module for user login identity authentication; the user module performing a verification and then returning a login session identifier of the viewing user to the viewing module, and the viewing module regularly submitting a heartbeat keep-alive request to the user module to maintain the login session;

step 3. the video source publishing module performing a hash calculation for the video source according to a preset function to obtain a unique video source identifier, and at the same time slicing and numbering uniformly the video source data, and calculating a hash code for each slice of video data source, to record the unique video source identifier, a video slice number, and a slice hash code in the video source information module;

step 4. the video source publishing module submitting information comprising a generated current video relay session identifier and the video source identifier to the relay session Module for storage after the video source publishing module and the relay module has established a video relay session;

step 5. the video source publishing module starting the transmission of the fragment of video data after the video source publishing module has established a video relay session with the relay source module; wherein the fragment of video data comprises the current video relay session identifier, video slice data, and slice numbers;

step 6. after the relay module has established a video relay session with the viewing module, the relay module submitting the current video relay session identifier and a video transmission session identifier generated in step 4 as a previous video relay session identifier, together with the video source identifier, to the relay session module to verify a legality of the relay video session:

if the relay session module cannot find a corresponding legal video session from the system according to the submitted previous video relay session identifier and the video source identifier, the relay session module returning a verification failure message to the relay module, and then the relay module terminating video relay;

if the relay session recording module finds a corresponding legal video session from the system according to the submitted previous video relay session identifier and the video source identifier, the relay session recording module recording the current video relay session identifier and returning a success message to the relay module, and then the relay module continuing to transmit video, and following steps continuing to be performed;

step 7. the viewing module regularly submitting a relay request to the relay module; wherein the request comprises information comprising the current video relay session identifier generated in step 6 and a starting number of the video slices to be transmitted;

step 8. the relay module verifying the relay request received in step 7:

if a verification is passed, the relay module continuing to relay the fragment of video data to the viewing module, and steps 7 and 8 being repeated to achieve continuous video relay;

if the verification fails, the relay module stopping relaying the fragment of video data to the viewing module to terminate following operations;

step 9. the viewing module regularly submitting video relay behavior data to the relay behavior module; wherein the relay behavior data comprises the relay and viewing user login identifiers, relay and viewing user login session identifiers, current video slice numbers, hash code of current video slice, and current relay session identifier;

step 10. the relay behavior recording module submitting the viewing and relay user login identifiers received in step 9 to the user module to verify whether login status of the users are normal:

if the user module cannot find a corresponding login session from an online user session table according to a submitted user login identifier, the user module returning a verification failure message to the relay behavior recording module, and then the relay behavior recording module cancelling the current relay behavior recording request and returning immediately;

if the user module can find the corresponding session from the online user session table according to the submitted user login identifier, the user module returning a verification success message to the relay behavior recording module, and following steps continuing to be performed;

step 11. the relay behavior recording module submitting the relay session identifier received in step 9 to the relay session module for verification:

if the relay session module cannot find a corresponding relay session identifier in a relay session storage, the relay session module returning a verification failure message to the relay behavior recording module, and then the relay behavior recording module canceling the current relay behavior recording request to terminate subsequent steps immediately;

if the relay session module can find a corresponding relay session identifier in the relay session storage, the relay session module returning a verification success message to the relay behavior recording module, and following steps continuing to be performed;

step 12. the relay behavior recording module submitting the video source identifier, the video slice number and a hash code of the video slice data corresponding to the number received in step 9 to the video source information module for verification:

if the video source information module fails to verify the request, the video source information module returning a verification failure message to the relay behavior recording module, and then the relay behavior recording module canceling the current relay behavior recording request to immediately terminate subsequent operation steps;

if the video source information module successfully verifies the request, the video source information module returning a verification success message to the relay behavior recording module, and then the relay behavior recording module storing the current relay behavior record;

step 13. the relay reward module regularly obtaining unprocessed newly added relay behavior data from the relay behavior recording module; and step 14. the relay reward module analyzing the relay behavior data obtained in step 13, calculating a relay reward coefficient for a corresponding relay user to calculate a relay reward points, and finally writing the relay reward points into the blockchain system, which comprises:

first, defining a reward calculation formula of each relay node as:

$$reward_i = r_i * reward_{base} * time * bitrate$$

wherein, $reward_i$ is a reward base number for providing a unit bandwidth in units of yuan/GB or cent/GB, which is also an obtained reward amount or reward points per GB of provided traffic;
wherein, $r_i$ is a reward coefficient of $i^{th}$ relay node;
time is a relay period duration of the current relay record;
bitrate is a bit rate of the current relay video;
second, defining a relay receiving user concentration ratio $f_u$ of a certain relay user per unit time as:

$$f_u = \frac{s}{n} - 1$$

wherein, s is a total number of relay sessions relayed and distributed by the relay user to the next viewing users per unit time;
n is an independent user quantity of viewing users when the relay user is relaying to the next viewing users per unit time, which is also a total number of all viewing users after deduplication;
assuming that a relay user A has relayed and forwarded videos to a viewing user B three times in a unit time, a relay independent receiving user quantity of A (n) is still counted as 1, and a total number of relay sessions (s) is counted as 3, so the relay receiving user concentration ratio $f_u$ of A is 2;
third, defining an average receiving duration of next relay forwarding viewing users corresponding to a previous relay session identifier of a certain relay user as:

$$\bar{t} = \frac{1}{n} \sum_{k=0}^{n} t_i$$

wherein, $t_i$ is a receiving duration of $i^{th}$ viewing user corresponding to the relay session identifier;
furthermore, defining a receiving video duration concentration ratio $f_t$ of the viewing users when a certain relay user relay a certain session for $i^{th}$ time as:

$$f_t = \frac{t_{max}}{\bar{t}} - 1$$

wherein, $t_{max}$ is a maximum receiving duration of the viewing users corresponding to the current relay session;
$\bar{t}$ is an average receiving duration of each viewing user corresponding to the relay session;
finally, defining $i^{th}$ relay reward coefficient of a certain relay user as:

$$r_i = \frac{1}{e^{f u^2}} * \frac{1}{e^{f t^2}}$$

therefore, defining a final reward calculation formula for a certain relay node as:

$$reward = \sum_{k=0}^{n} \frac{1}{e^{f u^2}} * \frac{1}{e^{f t^2}} * reward_{base} * time_i * birate$$

wherein, $time_i$ is a relay duration of $i^{th}$ relay record of a certain relay node, and n is a total number of forwardings; and
the relay reward module regularly obtaining unprocessed relay behavior data from the relay behavior recording module, calculating a reward value of the relay node according to the above formula, and writing the reward value into the blockchain system so that the system can reward the relay user.

11. A device, the device comprising:
one or more processors;
a memory, configured to store one or more programs,
when the one or more programs are executed by the one or more processors, the one or more processors executing a database writing approach, comprising:
a video source node slicing a video source and relaying fragment of video data to next nodes;
a relay node user receiving relayed fragment of video data from a previous node and writing a video relay session information to a system;
a viewing node establishing a video relay session with the relay node, receiving, reassembling, decoding and playing the fragment of video data, and at the same time regularly recording relay behavior data to the system; and
a relay reward node regularly obtaining unprocessed relay behavior data, calculating a reward value for each relay user, and writing the reward value into a blockchain system, which comprises:
first, defining a reward calculation formula of each relay node as:

$$reward_i = r_i * reward_{base} * time * bitrate$$

wherein, $reward_i$ is a reward base number for providing a unit bandwidth in units of yuan/GB or cent/GB, which is also an obtained reward amount or reward points per GB of provided traffic;
wherein, $r_i$ is a reward coefficient of $i^{th}$ relay node;
time is a relay period duration of the current relay record;
bitrate is a bit rate of the current relay video;
second, defining a relay receiving user concentration ratio $f_u$ of a certain relay user per unit time as:

$$f_u = \frac{s}{n} - 1$$

wherein, s is a total number of relay sessions relayed and distributed by the relay user to the next viewing users per unit time;
n is an independent user quantity of viewing users when the relay user is relaying to the next viewing users per unit time, which is also a total number of all viewing users after deduplication;
assuming that a relay user A has relayed and forwarded videos to a viewing user B three times in a unit time, a relay independent receiving user quantity of A (n) is still counted as 1, and a total number of relay sessions (s) is counted as 3, so the relay receiving user concentration ratio $f_u$ of A is 2;

third, defining an average receiving duration of next relay forwarding viewing users corresponding to a previous relay session identifier of a certain relay user as:

$$\bar{t} = \frac{1}{n}\sum_{i=0}^{n} t_i$$

wherein, $t_i$ is a receiving duration of $i^{th}$ viewing user corresponding to the relay session identifier;

furthermore, defining a receiving video duration concentration ratio $f_t$ of the viewing users when a certain relay user relay a certain session for $i^{th}$ time as:

$$f_t = \frac{t_{max}}{\bar{t}} - 1$$

wherein, $t_{max}$ is a maximum receiving duration of the viewing users corresponding to the current relay session;

$\bar{t}$ is an average receiving duration of each viewing user corresponding to the relay session;

finally, defining $i^{th}$ relay reward coefficient of a certain relay user as:

$$r_i = \frac{1}{e^{f_u^2}} * \frac{1}{e^{f_t^2}}$$

therefore, defining a final reward calculation formula for a certain relay node as:

$$reward = \sum_{i=0}^{n} \frac{1}{e^{f_u^2}} * \frac{1}{e^{f_t^2}} * reward_{base} * time_i * bitrate$$

wherein, $time_i$ is a relay duration of $i^{th}$ relay record of a certain relay node, and n is a total number of forwardings; and the relay reward node regularly obtaining unprocessed relay behavior data from the relay behavior recording module, calculating a reward value of the relay node according to the above formula, and writing the reward value into the blockchain system so that the system can reward the relay user.

12. The device according to claim 11, wherein relay users and viewing users logging into the system separately and keeping active connections before the video source node slicing the video source.

13. The device according to claim 12, wherein the relay users and viewing users logging into the system separately and keeping active connections further comprises:

the relay nodes and the viewing nodes respectively submitting login user names and passwords to a user module;

the user module verifying whether the user names and passwords are correct:

if not, the user module returning a verification failure message to the user node, and the user node prompting a user with a login failure message, and then subsequent operations ending; and if yes, the user module returning a login session identifier to the user node, and the user node receiving and storing the login session identifier, and keeping an active connection with the user module by sending heartbeat packets, so that the user module persistently stores the login session identifiers for users.

14. The device according to claim 11, wherein the video source node slicing the video source and distributing the fragment of video data to next nodes further comprises:

the video source node calculating a hash code for each video source as its unique video source identifier according to a preset function, slicing and numbering uniformly the video source data, and calculating a hash code for each slice of video data;

the video source node recording information comprising the video source identifier, video slice numbers, and corresponding slice hash code in a video source information module; and the video source node establishing a video transmission session with a next node, and when starting to transmit video slice data, recording a generated unique session identifier in the system as a video source session identifier.

15. The device according to claim 11, wherein the relay node user receiving the relayed fragment of video data from the previous node and writing the video relay session information to the system further comprises:

the relay node establishing a video transmission session with the previous node, starting to receive video slices, generating an identifier that identifies a current relay session, and submitting a newly added session request to a relay session module;

the relay session module verifying whether the current video relay session identifier in the newly added session request is legal:

if not, returning a request failure message, and the relay node stopping receiving the video; and if yes, the relay node continuing to receive the fragment of video data.

16. The device according to claim 11, wherein the viewing node establishing the video relay session with the relay node, and receiving, reassembling, decoding and playing the fragment of video data, and at the same time regularly recording relay behavior data to the system further comprises:

the viewing node establishing a video relay session with a previous relay node, and the relay node submitting a newly added session request comprising the current relay session identifier and a corresponding previous relay session identifier to the relay session module; wherein the request comprises the current video relay session identifier, the previous relay video session identifier corresponding to the current session, and a login session identifier of the viewing user;

the relay session module verifying whether the previous relay video session exists:

if not, returning a request failure message and stopping receiving the video;

if yes, the relay session module recording the current relay session identifier, and returning a successful recording message to the relay node, and then the relay node sending the relayed fragment of video data to the viewing node, and the following steps continuing to be performed;

the viewing node sending a relay request to the relay node to request the relay node to continue to relay a next relay period threshold duration to the viewing node; wherein request information mainly comprises a current relay video session identifier, a maximum video slice number of a previous relay, a login identifier of the viewing user, and a time point of the current relay request;

the viewing node receiving the fragment of video data and performing operations of reassembling, decoding and playing video; and the viewing node determining whether it is time to send the relay request, that is, within a time interval less than a relay period threshold since a previous relay request was sent:

if not, the viewing node continuing to wait and receiving the fragment of video data to perform the operations of reassembling, decoding and playing video; and if yes, the viewing node initiating a recording request for writing a relay behavior to a relay behavior recording module, and sending a relay request to the relay node.

* * * * *